US010104063B2

(12) United States Patent
Hu et al.

(10) Patent No.: US 10,104,063 B2
(45) Date of Patent: Oct. 16, 2018

(54) ANDROID-BASED MOBILE EQUIPMENT SECURITY PROTECTION METHOD, AND DEVICE

(71) Applicants: BEIJING QIHOO TECHNOLOGY COMPANY LIMITED, Beijing (CN); QIZHI SOFTWARE (BEIJING) COMPANY LIMITED, Beijing (CN)

(72) Inventors: Zhong Hu, Chaoyang District (CN); Xin Wang, Chaoyang District (CN)

(73) Assignee: BEIJING QIHOO TECHNOLOGY COMPANY LIMITED, Xicheng District (CN)

( * ) Notice: Subject to any disclaimer, the term of this patent is extended or adjusted under 35 U.S.C. 154(b) by 118 days.

(21) Appl. No.: 15/036,934

(22) PCT Filed: Aug. 26, 2014

(86) PCT No.: PCT/CN2014/085188
§ 371 (c)(1),
(2) Date: May 16, 2016

(87) PCT Pub. No.: WO2015/070654
PCT Pub. Date: May 21, 2015

(65) Prior Publication Data
US 2016/0285854 A1 Sep. 29, 2016

(30) Foreign Application Priority Data
Nov. 15, 2013 (CN) .......................... 2013 1 0573955

(51) Int. Cl.
H04L 9/00 (2006.01)
H04L 29/06 (2006.01)
(Continued)

(52) U.S. Cl.
CPC ............ *H04L 63/083* (2013.01); *G06F 21/88* (2013.01); *G08B 13/22* (2013.01); *H04W 4/06* (2013.01);
(Continued)

(58) Field of Classification Search
CPC ....................................... H04L 9/002
See application file for complete search history.

(56) References Cited

U.S. PATENT DOCUMENTS 9,460,706 B1 * 10/2016 Savant ................ G06F 17/2785
2008/0022397 A1 * 1/2008 Cheng ................ H04L 63/1433
726/20

(Continued)

FOREIGN PATENT DOCUMENTS

CN 101287251 B 9/2011
CN 102314568 A 1/2012
(Continued)

OTHER PUBLICATIONS

State Intellectual Property Office of the Peoples Republic of China, First Office Action in Chinese Application No. 201310573955.1, dated Nov. 25, 2015.
(Continued)

Primary Examiner — Josnel Jeudy
(74) Attorney, Agent, or Firm — LKGlobal | Lorenz & Kopf, LLP

(57) ABSTRACT

The present invention discloses a method and device for the security protection of Android-based mobile equipment, the method comprising: parsing a short message received at the framework layer of a mobile equipment; determining, on the basis of the parsing result, whether contents of the short message comprise a security protection instruction; if the contents of the short message comprise the security protection instruction, providing the contents of the short message
(Continued)

to a mobile equipment protection application of the application layer; if the contents of the short message do not comprise the security protection instruction, then proceeding to send a broadcast corresponding to the short message; wherein the mobile equipment protection application is a built-in system application, and when the sender of the short message is a predetermined object, the mobile equipment protection application performs a corresponding security protection operation according to the security protection instruction comprised in the contents of the short message.

16 Claims, 4 Drawing Sheets

(51) Int. Cl.
| | | |
|---|---|---|
| G06F 21/88 | (2013.01) | |
| H04W 4/14 | (2009.01) | |
| H04W 12/12 | (2009.01) | |
| H04W 4/06 | (2009.01) | |
| G08B 13/22 | (2006.01) | |
| H04W 12/06 | (2009.01) | |
| G08B 15/00 | (2006.01) | |
| G08B 21/24 | (2006.01) | |

(52) U.S. Cl.
CPC .............. *H04W 4/14* (2013.01); *H04W 12/06* (2013.01); *H04W 12/12* (2013.01); *G08B 15/00* (2013.01); *G08B 21/24* (2013.01)

(56) References Cited

U.S. PATENT DOCUMENTS

| 2012/0064941 A1 | 3/2012 | Chen |
| 2012/0149331 A1 | 6/2012 | Wu et al. |

FOREIGN PATENT DOCUMENTS

| CN | 102413456 A | 4/2012 |
| CN | 102929807 A | 2/2013 |
| CN | 103067392 B | 4/2013 |
| CN | 103338443 A | 10/2013 |
| CN | 103577773 A | 2/2014 |
| CN | 102739868 B | 7/2016 |

OTHER PUBLICATIONS

State Intellectual Property Office of the Peoples Republic of China, Second Office Action in Chinese Application No. 201310573955.1, dated Feb. 26, 2016.
International Bureau of WIPO, International Search Report in Application No. PCT/CN2014/085188, dated Nov. 25, 2015.
International Bureau of WIPO, Written Opinion of the International Searching Authority in Application No. PCT/CN2014/085188, dated Nov. 25, 2015.

* cited by examiner

US 10,104,063 B2

ANDROID-BASED MOBILE EQUIPMENT SECURITY PROTECTION METHOD, AND DEVICE

CROSS-REFERENCE TO RELATED APPLICATIONS

This application is a U.S. National-Stage entry under 35 U.S.C. § 371 based on International Application Number PCT/CN2014/085188, filed Aug. 26, 2014 and which claims priority to Chinese Application Number 201310573955.1, filed Nov. 15, 2013, which are all hereby incorporated herein in their entirety by reference.

TECHNICAL FIELD

The present invention relates to Android technology, particularly to an Android-based mobile equipment security protection method and a device.

BACKGROUND

Currently, Android-based mobile equipment (such as mobile phones or tablets, etc.) have already been very popular.

Because loss of the mobile equipment occurs sometimes, security management applications (which can also referred to as security software or security management application programs, etc.) in the Android-based mobile equipments all have a security protection function (which can also referred to as an anti-theft function); after a user lost his mobile equipment, a specific remote control can be performed on the mobile equipment based on the anti-theft function in the security management application of his lost mobile equipment.

The existing way in which the anti-theft function is realized by the security management application is that: a mobile phone number of another mobile equipment is preset by the user through the security management application in his mobile equipment, this mobile phone number can be referred to as a safe number; meanwhile, a security protection instruction (i.e., an anti-theft instruction) can be pre-set by the user through the security management application; in the case that the user enables the anti-theft function, the security management application listens to short message broadcasting of the operating system to monitor short message events; the security management application parses, after hearing the short message broadcasting, contents of the short message received currently by the mobile equipment; in the case that the security management application determines according to the parsing results that the sender of the short message is a secure number, and the contents of the short message are the pre-set anti-theft instruction, operations corresponding to the anti-theft instruction will be performed.

The above mentioned anti-theft instruction and the operations corresponding to the anti-theft instruction generally comprise:

a locking instruction: for locking the screen of the mobile equipment and popping up an unlock screen, so that only when the input unlock password is correct, the screen can be unlocked to enter a home page of the mobile equipment;

a positioning instruction: for sending the position information on the mobile equipment to the secure number through a short message;

an alarm instruction: for sounding an alarm by the mobile equipment continuously;

a data removing instruction: for deleting corresponding user data in the mobile equipment to protect privacy of the user.

During the course of implementing the present invention, the inventor found that, if the mobile equipment is connected to a computer, the security management application in the mobile equipment can be uninstalled easily by using the computer and meanwhile the anti-theft function in the security management application will also be disabled along. It can be known therefore, that the security protection efforts of the existing security software for the mobile equipment needs to be further improved. In addition, other objects, desirable features and characteristics will become apparent from the subsequent summary and detailed description, and the appended claims, taken in conjunction with the accompanying drawings and this background.

SUMMARY

In view of the above problem, the present invention is proposed, so as to provide an Android-based mobile equipment security protection method and a corresponding Android-based mobile equipment security protection device for overcoming the above problem or at least partially solving the above problem.

In accordance with an aspect of the present invention, a method for security protection of Android-based mobile equipment is provided, the method including parsing a short message received at the framework layer of a mobile equipment. Determining, on the basis of the parsing result, whether contents of the short message comprise a security protection instruction. Providing the contents of the short message to a mobile equipment protection application of the application layer, if the contents of the short message comprise the security protection instruction. Sending a broadcast corresponding to the short message, if the contents of the short message do not comprise the security protection instruction. The mobile equipment protection application is a built-in system application, and when the sender of the short message is a predetermined object, the mobile equipment protection application performs a corresponding security protection operation according to the security protection instruction comprised in the contents of the short message.

In accordance with another aspect of the present invention, a device for security protection of Android-based mobile equipment comprising one or more non-transitory computer readable medium configured to store computer-executable instruction and at least one processor to execute the instruction to cause parsing a short message received at the framework layer of a mobile equipment, determining, on the basis of the parsing result, whether contents of the short message comprise a security protection instruction. Providing the contents of the short message to a mobile equipment protection application of the application layer, if the contents of the short message comprise the security protection instruction. Sending a broadcast corresponding to the short message, if the contents of the short message do not comprise the security protection instruction. The mobile equipment protection application is a built-in system application, and is configured to perform a corresponding security protection operation according to the security protection instruction comprised in the contents of the short message when the short message is a short message sent by a predetermined object.

According to the Android-based mobile equipment security protection method and device of the present invention, by parsing the contents of the short message before sending corresponding broadcast for the short message received by it at the framework layer, and providing the security protection instruction to the built-in system application (i.e., the mobile equipment protection application) in the case where it is determined that the contents of the short message comprise the security protection instruction, the mobile equipment protection application can perform the corresponding security protection operation according to the security protection instruction; since the user cannot easily uninstall this mobile equipment protection application by connecting the mobile equipment to a computer, the security protection efforts for the mobile equipment is improved by the present invention.

In accordance with another aspect of the present invention, a non-transitory computer readable medium in which having instructions stored thereon that, when executed by at least one processor, cause the at least one processor to perform operations for security protection of Android-based mobile equipment, which comprises the steps of parsing a short message received at the framework layer of a mobile equipment. Determining, on the basis of the parsing result, whether contents of the short message comprise a security protection instruction. Providing the contents of the short message to a mobile equipment protection application of the application layer, if the contents of the short message comprise the security protection instruction. Sending a broadcast corresponding to the short message, if the contents of the short message do not comprise the security protection instruction. The mobile equipment protection application is a built-in system application, and when the sender of the short message is a predetermined object, the mobile equipment protection application performs a corresponding security protection operation according to the security protection instruction comprised in the contents of the short message.

The above explanation is merely an outline of the technical solution of the present application. In order to be able to understand the technical means of the present application more clearly and to be able to implement it in accordance with the contents of the specification, and in order to enable the above and other objects, features and advantages of the present application more evident and comprehensible, the specific embodiments of the present application are particularly described in the following.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
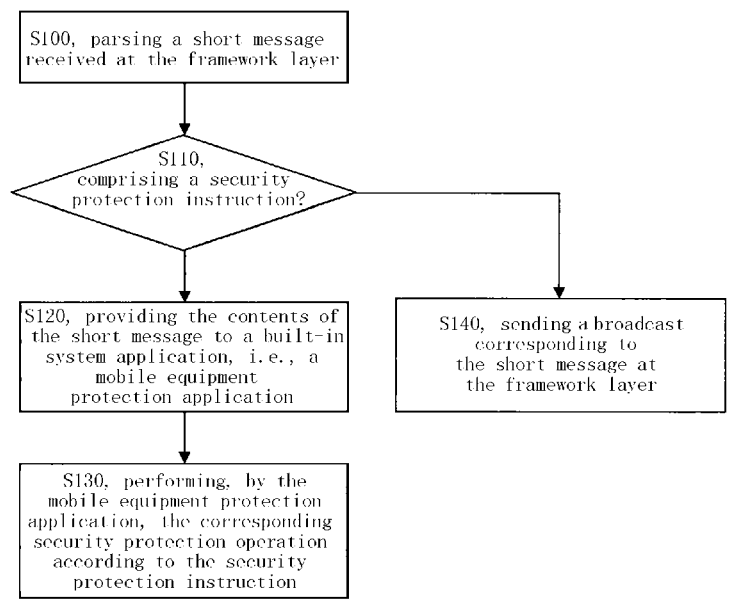
FIG. 1 shows a flowchart of a method for security protection of Android-based mobile equipment according to Embodiment 1 of the present invention.

The following detailed description is merely exemplary in nature and is not intended to limit the invention or the application and uses of the invention. Furthermore, there is no intention to be bound by any theory presented in the preceding background of the invention or the following detailed description.

Below, the exemplary embodiments of the present disclosure will be described further in detail with reference to the drawings. Although the exemplary embodiments of the present disclosure are showed in the drawings, it is to understand that, the present disclosure can be implemented in various forms and shall not be limited by the embodiments here set forth. In contrary, these embodiments are provided in order to be able to understand the present disclosure more thoroughly and to be able to transfer the scope of the present disclosure fully to those skilled in the art.

Embodiment 1 a method for security protection of Android-based mobile equipment. The method of the present embodiment will be explained below in connection with FIG. 1.

In FIG. 1, in S100, parsing a short message received at the framework layer of a mobile equipment.

Specifically, the mobile equipment in the present embodiment can be a mobile equipment, such as a smart mobile phone or a tablet (such as a 3G based tablet), which can realize the short messaging, and the short message in the present embodiment can comprise an SMS (i.e., the short message in text format) or an MMS (i.e., the short message in multimedia format).

In the present embodiment, it is needed to perform the parsing operation of the short message after the short message is received by the framework layer of the mobile equipment and before the framework layer sends broadcast for this short message. That is, in the present embodiment, a parsing process for the short message is newly added before the framework layer performs a broadcast operation for the short message, and the parsing process for the short message may cause the broadcast operation no longer to be performed.

Because when receiving the short message by the framework layer in the mobile equipment, a short message dispatching function in the framework layer will be invoked, in the present embodiment, the existing short message dispatching function can be modified, so that the short message dispatching function will perform the parsing process for the short message first when the short message dispatching function is invoked. For example, when the short message dispatching function is invoked, the short message dispatching function invokes a short message checking function, so that the short message received by the framework layer will be parsed by the short message checking function. The short message checking function is a function added by the present embodiment and the short message checking function belongs to a mobile equipment protection service; the mobile equipment protection service is a system service added by the present embodiment.

It should be noted that, the framework layer can determine first whether the mobile equipment has enabled the security protection function before performing the above mentioned short message parsing. The framework layer will perform the parsing process for the short message only in the case that it is determined that the mobile equipment has enabled the security protection function, otherwise the parsing process for the short message will not be performed. The framework layer can determine whether the mobile equipment has enabled the security protection function according to security protection setting information stored by it in advance, and the specific contents of the security protection setting information will be described below.

In S110, it is determined according to the result obtained from the above parsing, whether the contents of the short message comprise a security protection instruction. If the contents of the short message comprise the security protection instruction, then the process proceeds to S120. If the contents of the short message do not comprise the security protection instruction, then the process proceeds to S140.

Specifically, in the present embodiment, the contents of the short message obtained from the parsing usually comprise information on the sender of the short message (i.e., the mobile phone number) and the message contents and so on. In this step, it is mainly determined whether the message contents comprise the security protection instruction; for example, the short message checking function searches the message contents for whether information exists which matches the format of the security protection instructions set in advance. If the information which matches the format exists, then it is considered that the contents of the short message comprise the security protection instructions, otherwise it is considered that the contents of the short message do not comprise the security protection instructions.

In the present embodiment, information on the format of the security protection instructions is set in the framework layer in advance, and the information on the format of the security protection instructions can be set in the framework layer by the application layer. For example, the security management application provides a security protection setting interface for the user, and the user can input the corresponding security protection setting information through the setting interface. Thereafter, a setting function in the security management application provides the security protection setting information input by the user from the application layer to the framework layer, by invoking the setting function in the framework layer, so that the framework layer can extracts and stores information needed by it from the security protection setting information. A specific example is: the above security protection setting information input by the user usually comprises: enabling/disabling of the security protection function, a communication number (i.e., the safe number) of a predetermined object and at least one security protection instruction, and each security protection instruction shall comprise a corresponding password; the setting function in the framework layer can store the security protection instructions therein at the framework layer, so that the short message checking function can perform the above determination operation as to whether the security protection instructions are comprised, based on the stored security protection instructions.

In S120, the above contents of the short message obtained from the parsing are provided to a mobile equipment protection application in the application layer, thereafter the process proceeds to S130.

Specifically, the mobile equipment protection application is a built-in system application of the mobile equipment. The built-in system application here usually means an application built into a system section, which is usually installed in the mobile equipment when the mobile equipment leaves the factory, and which usually only can be uninstalled when a ROOT permission is possessed. The framework layer can provide the contents of the short message to the mobile equipment protection application by function invoking. For example, the short message checking function in the framework layer invokes the instruction processing function of the application layer after it is determined that the contents of the short message comprise the security protection instruction, so as to provide the contents of the short message obtained from the parsing to the instruction processing function in the application layer. The instruction processing function is a function added in the application layer in the present embodiment, and the instruction processing function belongs to the instruction processing service added in the application layer in the present embodiment.

It should be noted that, the contents of the short message provided to the mobile equipment protection application of the application layer can comprise the above contents of the short message obtained from the parsing, and can also comprise: identification information corresponding to the security protection instruction comprised in the short message, the identification information can uniquely identify one security protection instruction.

In S130, the mobile equipment protection application performs the corresponding security protection operations according to the security protection instruction comprised in the contents of the short message, in the case that it is determined that the short message is a short message sent by the predetermined object.

Specifically, the mobile equipment protection application can check first whether the security protection function of the mobile equipment is in an enabled state. In the case that it is determined that the security protection function is in a disabled state, the mobile equipment protection application no longer performs the following security protection operations. In the case that it is determined that the security protection function is in the enabled state, the mobile equipment protection application shall continue to perform the following security protection operations. A specific example is: in the case that the security protection function is in the enabled state, the mobile equipment protection application shall also further determine whether the sender of the short message is the predetermined object (that is, determine whether the short message comes from a safe number). If the sender of the short message is the predetermined object, then the mobile equipment protection application shall continue to perform the following security protection operations; if the sender of the short message is not the predetermined object, then the mobile equipment protection application no longer performs the following security protection operations.

It can be known from the above description that, the security protection setting information such as enabling/disabling of the security protection function, the communication number (i.e., the safe number) of the predetermined object and the security protection instructions comprising passwords shall be set in the application layer.

A specific example for setting the security protection setting information in the application layer in advance in the present embodiment is: the security management application provides for the user a setting interface for the security protection setting information and the user inputs the security protection setting information through the setting interface. For example, the user sets the security protection function to be enabled and sets a safe number and the password comprised in the security protection instruction which the user needs to enable. The above security protection instruction which is needed to be enabled can be one security protection instruction, or can also be a plurality of security protection instructions, or can also be all of the security protection instructions. The setting function in the security management application provides the security protection setting information input by the user to the framework layer by invoking the setting function in the framework layer; the above setting function in the framework layer is a function added in the present embodiment and belongs to the mobile equipment protection service in the framework layer; the setting function in the framework layer then invokes the instruction processing function in the mobile equipment protection application to provide the security protection setting information to the mobile equipment protection application, thereby the instruction processing function can store the security protection setting information in a folder corresponding to the mobile equipment protection application. The above instruction processing function is a function added in the present embodiment and belongs to the instruction processing service in the application layer.

It should be noted that, in the present embodiment, other methods can also be used to set the security protection setting information in the application layer. For example, the security management application transmits the security protection setting information to the mobile equipment protection application by way of broadcasting, so that the mobile equipment protection application stores the security protection setting information received based on the broadcasting in the folder corresponding it.

In addition, it should be noted that, the operation in this step for determining whether the sender of the short message is the predetermined object can be performed in S120. For example, after the short message is parsed, the framework layer determines whether the short message comes from the predetermined object, according to the information on the sender in the contents of the short message. If the short message comes from the predetermined object and the contents of the short message comprise the security protection instructions, then the framework layer provides the contents of the short message obtained from the parsing thereof to the mobile equipment protection application in the application layer, otherwise the framework layer will not provides the contents of the short message obtained from the parsing thereof to the mobile equipment protection application in the application layer.

After the instruction processing function in the mobile equipment protection application determines that the security protection function of the mobile equipment is in the enabled state and the sender of the short message is the predetermined object, the instruction processing function shall perform determination on the specific security protection instructions comprised in the contents of the short message one by one. For example, for one of the security protection instructions comprised in the contents of the short message, it is determined whether the security protection instruction is a mobile equipment alarm instruction, a mobile equipment screen locking instruction, a data removing instruction, a mobile equipment locating instruction or a shooting instruction.

If the security protection instruction comprised in the contents of the short message is the mobile equipment alarm instruction, then the instruction processing function determines whether the password in the mobile equipment alarm instruction comprised in the contents of the short message is the same as the password in the mobile equipment alarm instruction set in advance. If the two are the same, then the instruction processing function performs an alarming operation, such as triggering the mobile equipment to sounding an alarm continuously and flash lights and so on; if the two are different, then the instruction processing function does not perform the above alarming operation.

If the security protection instruction comprised in the contents of the short message is the mobile equipment screen locking instruction, then the instruction processing function determines whether the password in the mobile equipment screen locking instruction comprised in the contents of the short message is the same as the password in the mobile equipment screen locking instruction set in advance. If the two are the same, then the instruction processing function performs an screen locking operation, for example the instruction processing function sets a screen locking password to the mobile equipment, so that the mobile equipment will enter the main display page of the mobile equipment only when receiving a correct screen locking password; if the two are different, then the instruction processing function does not perform the above screen locking operation.

If the security protection instruction comprised in the contents of the short message is the data removing instruction, then the instruction processing function determines whether the password in the data removing instruction comprised in the contents of the short message is the same as the password in the data removing instruction set in advance. If the two are the same, then the instruction processing function performs a data deleting operation, for example, the instruction processing function deletes corresponding data (such as calling records in the address book and photos in a photo application and so on) according to information set in advance, so as to protect the private data of the user; if the two are different, then the instruction processing function does not perform the above data deleting operation.

If the security protection instruction comprised in the contents of the short message is the mobile equipment locating instruction, then the instruction processing function invokes a locating function of a locating service in the application layer, wherein the locating service is a service added in the present embodiment; the locating function determines whether the password in the mobile equipment locating instruction comprised in the contents of the short message is the same as the password in the mobile equipment locating instruction set in advance. If the two are the same, then the locating function invokes a locating function in the operating system to realize the locating of the mobile equipment, and locating information of the mobile equipment can be sent back to the predetermined object by the locating function of the locating service in the application layer in the form of a short message and so on; in addition, the locating function of the locating service in the present embodiment can invoke the locating function in the operating system regularly and send the locating information back to the predetermined object regularly in the form of a short message and so on, so that the predetermined object can be informed of the running track of their mobile equipment.

If the security protection instruction comprised in the contents of the short message is the shooting instruction, then the instruction processing function invokes a shooting function of a shooting service in the application layer, wherein the shooting service is a service added in the present embodiment; the shooting function determines whether the password in the shooting function comprised in the contents of the short message is the same as the password in the shooting function set in advance. If the two are the same, then the shooting function invokes a shooting function in the operating system to perform shooting by using the mobile equipment, and image information imaged and obtained by the mobile equipment can be uploaded to a predetermined server by the shooting function of the shooting service in the application layer and a link address of the image information in the server can be sent back to the predetermined object in the form of a short message and so on, so that the predetermined object can access the server according to the link address to obtain the shot image.

If the security protection instruction comprised in the contents of the short message is to enable all of the security protection instructions, then the instruction processing function determines whether the password in all of the security protection instructions to be enabled comprised in the contents of the short message is the same as the password in all of the security protection instructions to be enabled set in advance. If the two are the same, then the instruction processing function performs the above alarming, screen locking and data removing operations and invokes the locating function of the locating service and the shooting function of the shooting service in the application layer; if the two are different, then the instruction processing function does not perform the above operations.

It should be particularly noted that, if in S100 the framework layer has already performed the determination operation as to whether the mobile equipment has enabled the security protection function before performing the above short message parsing, then in this step the determination operation as to whether the security protection function of the mobile equipment is in the enabled state no longer needs to be performed.

In S140, broadcasting is sent for the above short message.

Specifically, the short message checking function can end its flow and exit, so that the short message dispatching function can continue to perform the following operations. For example, the short message dispatching function invokes a broadcast sending function to send the contents of the short message in the form of broadcast to an application (such as a short message application) in which a corresponding broadcast receiver is registered.

Embodiment 2 a method for security protection of Android-based mobile equipment. The method of the present embodiment will be explained below in detail in connection with FIGS. 2-4.

Figure 2:
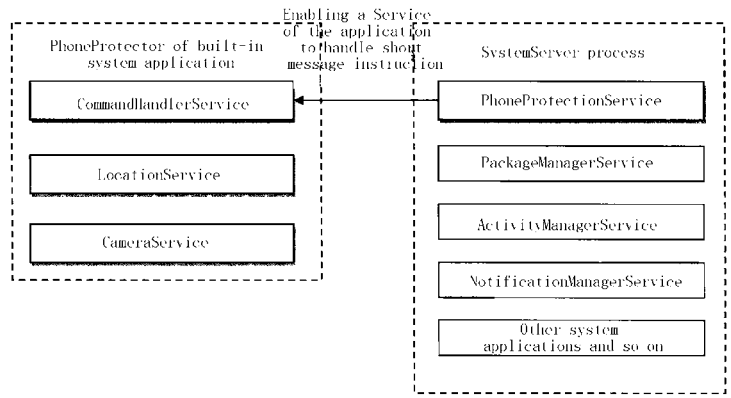
FIG. 2 shows a schematic diagram of an Android-based mobile equipment security protection framework according to Embodiment 2 of the present invention.

In the present embodiment, a system service is added in the framework layer of the operating system of the Android, i.e., a PhoneProtectionService (a phone protection service, which can also be referred to as a mobile equipment protection service) shown in FIG. 2; in the present embodiment, a built-in system application is also added, i.e., a PhoneProtector (a phone protection application, which can also be referred as a mobile equipment protection application) shown in FIG. 2 and the built-in system application comprises three services, i.e., a CommandHandlerService (an instruction processing service), a LocationService (a locating service) and a CameraService (a shooting service) shown in FIG. 2.

The PhoneProtectionService in the framework layer can be run in a SystemServer process, similar to system services in the operating system of the Android such as package management service (PackageManagerService). The PhoneProtectionService is mainly used to perform parsing processing on the short message received by the framework layer. If the contents of the short message obtained from the parsing comprise the security protection functions (which can also referred as anti-theft instructions), then the CommandHandlerService in the PhoneProtector is invoked to provide the contents of the short message obtained from the parsing to the CommandHandlerService.

The PhoneProtector in the application layer is installed in the mobile equipment in advance as a built-in system application. The PhoneProtector is mainly used to perform operations such as a determination operation as to whether the mobile equipment protection function has been enabled, a determination operation as to whether the short message comes from a safe number, a screen locking operation of the mobile equipment, an alarming operation of the mobile equipment, a data removing operation and enable on of corresponding services (the LocationService and the CameraService) and so on.

Figure 3:
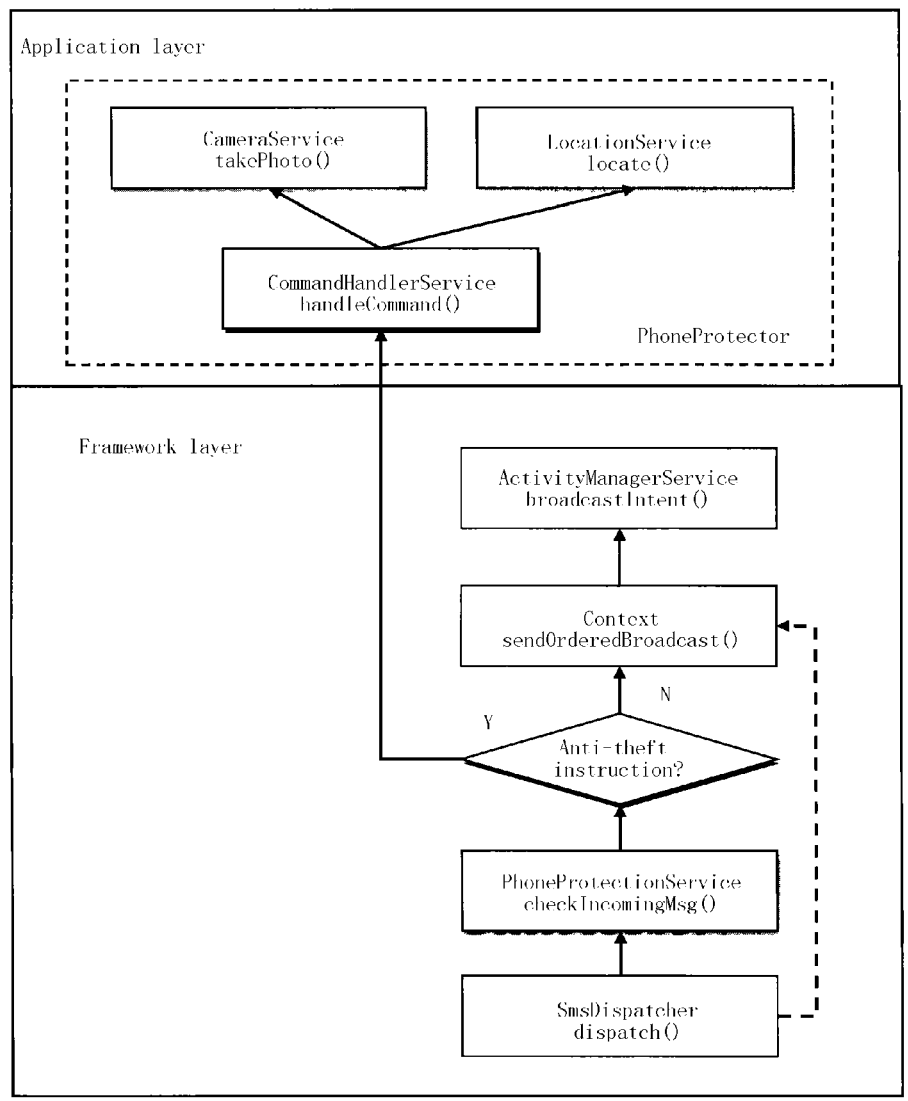
FIG. 3 shows a flowchart of an Android-based mobile equipment security protection method according to Embodiment 2 of the present invention.

A specific implementation process of the present embodiment is as shown in FIG. 3. When the framework layer receives a short message, a dispatch ( ) (i.e., the short message dispatching function) in the framework layer will be invoked. In the prior art, the dispatch ( ) will, after the completion of the execution of itself, directly invoke sendOrderedBroadcast ( ), as shown by the dotted line at the right side of FIG. 3, while in the present embodiment, the dispatch ( ) is modified so that: when it is invoked, a checkIncomingMsg ( ) (i.e., the short message checking function) in the PhoneProtectionService added in the present embodiment is invoked first, the checkIncomingMsg ( ) performs parsing on the short message received by the framework layer; and determines whether the contents of the short message comprise security protection instructions (i.e., anti-theft instructions) according to the parsing result, and in the case that the checkIncomingMsg ( ) determines that the contents of the short message do not comprise the security protection instructions, the checkIncomingMsg ( ) itself ends and exits, so that the dispatch ( ) continues to perform its following normal operations. For example, the dispatch ( ) invokes the sendOrderedBroadcast ( ) to perform broadcast for the short message. In the case that the checkIncomingMsg ( ) determines that the contents of the short message comprise the security protection instructions, the checkIncomingMsg ( ) invokes a handleCommand ( ) (i.e., the instruction processing function) in the CommandHandlerService to provide the contents of the short message obtained from the parsing to the handleCommand ( ); in the case that the handleCommand ( ) determines, according to the security protection setting information set in advance, that the short message comes from the safe number, and the security protection instructions in the contents of the short message comprise the mobile equipment alarm instruction, the mobile equipment screen locking instruction or the data removing instruction, the handleCommand ( ) performs corresponding operations such as the alarming operation, the screen locking operation and the data removing operation; and in the case that the handleCommand ( ) determines, according to the security protection setting information set in advance, that the short message comes from the safe number and the security protection instructions in the contents of the short message comprise the mobile equipment locating instruction or the shooting instruction, then the handleCommand ( ) enables the corresponding services such as invoking a takephoto ( ) in the CameraService or a locate ( ) in the LocationService to perform shooting or locating.

Figure 4:
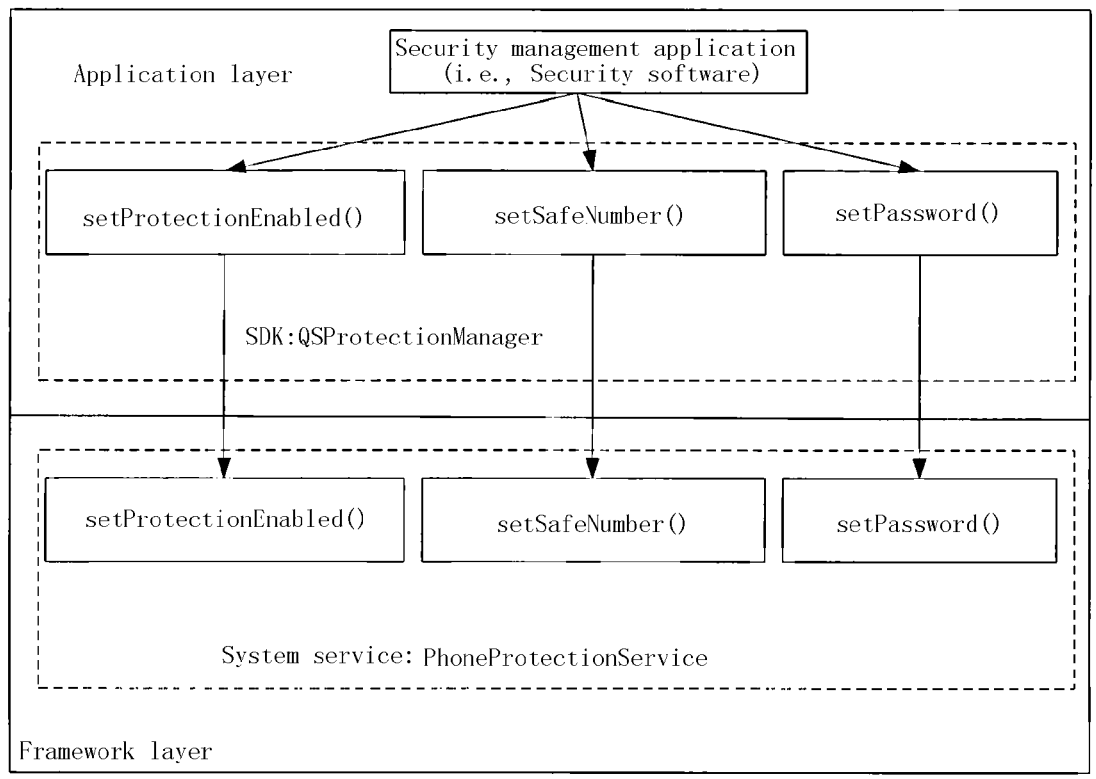
FIG. 4 shows a schematic diagram for setting security protection setting information according to Embodiment 2 of the present invention.

The above security protection instructions can adopt a self-defined format. For example, the security protection instructions are in the following formats:

the mobile equipment locating instruction: weizhi#password the mobile equipment alarm instruction: jingbao#password the mobile equipment screen locking instruction: suoding#password enable all of the security protection instructions (i.e., enable all of the anti-theft instructions): fangdao#password A setting method of the security protection setting information in the application layer in the present embodiment can be as shown in FIG. 4.

In FIG. 4, the security management application (which can also referred as security software) provides, for the user through the SDK (Software Development Kit), an interface for enabling/disabling the security protection function (i.e., enabling/disabling the anti-theft function), setting the safe number and setting the passwords.

After the user inputs the corresponding information, the security software will invoke the relevant function set in the application layer in advance in the present embodiment, such as a setProtctionEnabled ( ) (a function for setting the security protection function to be enabled/disabled), a setSafeNumber ( ) (a function for setting a safe number) and a setPassword ( ) (a function for setting passwords in the security protection instructions). These three functions in the application layer will invoke the setProtctionEnabled ( ), the setSafeNumber ( ) and the setPassword ( ) in the framework layer, respectively. Thereafter, the setProtctionEnabled ( ), the setSafeNumber ( ) and the setPassword ( ) in the framework layer will store the security protection setting information set by the user in the folder corresponding to the mobile equipment protection application by invoking the handleCommand ( ) in the application layer. In addition, the setProtctionEnabled ( ), the setSafeNumber ( ) and the setPassword ( ) in the framework layer can also store the corresponding information in the framework layer.

Embodiment 3: a device for security protection of Android-based mobile equipment. The device will be explained in detail below in connection with FIG. 5.

Figure 5:
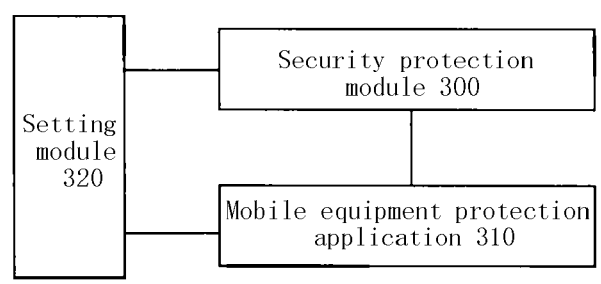
FIG. 5 shows a schematic diagram of a device for security protection of Android-based mobile equipment according to Embodiment 3 of the present invention.

The device shown in FIG. 5 is provided in a mobile equipment which can realize short messaging, for example provided in the mobile equipment such as a smart mobile phone or a 3G based tablet and so on.

The device shown in FIG. 5 mainly comprises: a security protection module 300 and a mobile equipment protection application 310; and the device can also comprise a setting module 320.

The security protection module 300 is mainly configured to parse a short message received at the framework layer of a mobile equipment; and determine, on the basis of the parsing result, whether contents of the short message comprise a security protection instruction; provide the contents of the short message to the mobile equipment protection application 310 of the application layer, if the contents of the short message comprise the security protection instruction; send broadcast corresponding to the short message, if the contents of the short message do not comprise the security protection instruction.

The security protection module 300 needs to perform the parsing operation of the short message after the short message is received by the framework layer of the mobile equipment and before the framework layer sends broadcast for this short message. That is, the security protection module 300 newly adds a parsing process for the short message before the framework layer performs a broadcast operation for the short message, and the parsing process for the short message by the security protection module 300 may cause the broadcast operation no longer to be performed.

Because when receiving the short message by the framework layer in the mobile equipment, a short message dispatching function in the framework layer will be invoked, the security protection module 300 can comprise a short message dispatching function after the existing short message dispatching function is modified, so that the short message dispatching function will perform the parsing process for the short message first when the short message dispatching function is invoked. For example, when the short message dispatching function is invoked, the short message dispatching function invokes a short message checking function (which belongs to the security protection module 300), so that the short message received by the framework layer will be parsed by the short message checking function. The short message checking function belongs to a mobile equipment protection service.

It should be noted that, the security protection module 300 can determine first whether the mobile equipment has enabled the security protection function before performing the above mentioned short message parsing. The security protection module 300 will perform the parsing process for the short message only in the case that it is determined that the mobile equipment has enabled the security protection function, otherwise the security protection module 300 will not perform the parsing process for the short message. The security protection module 300 can determine whether the mobile equipment has enabled the security protection function according to security protection setting information stored in the framework layer in advance.

The contents of the short message obtained from the parsing by the security protection module 300 usually comprise information on the sender of the short message (i.e., the mobile phone number) and the message contents and so on. The short message checking function searches the message contents for whether information exists which matches the format of the security protection instructions set in advance. If the information which matches the format exists, then it is considered that the contents of the short message comprise the security protection instructions, otherwise it is considered that the contents of the short message do not comprise the security protection instructions.

In the present embodiment, information on the format of the security protection instructions is set in the framework layer in advance (for example can be set in the security protection module 300), and the information on the format of the security protection instructions can be set in the framework layer by the setting module 320. For example, the setting module 320 provides a security protection setting interface for the user, and the user can input the corresponding security protection setting information through the setting interface. Thereafter, a setting function in the setting module 320 provides the security protection setting information input by the user from the application layer to the framework layer, by invoking the setting function in the framework layer, so that the framework layer can extracts and stores information needed by it from the security protection setting information.

The security protection module 300 can provide the contents of the short message obtained from the parsing by it to the mobile equipment protection application by function invoking. For example, the short message checking function in the security protection module 300 invokes the instruction processing function in the application layer after it is determined that the contents of the short message comprise the security protection instructions, so as to provide the contents of the short message to the instruction processing function in the application layer.

The short message checking function in the security protection module 300 can end its flow and exit, so that the short message dispatching function can continue to perform the following operations. For example, the short message dispatching function invokes a broadcast sending function to send the contents of the short message in the form of broadcast to an application (such as a short message application) in which a corresponding broadcast receiver is registered.

The mobile equipment protection application 310 is a built-in system application, and the mobile equipment protection application 310 is mainly configured to perform a corresponding security protection operation according to the security protection instruction comprised in the contents of the short message in the case where the short message is a short message sent by a predetermined object.

Specifically, the mobile equipment protection application 310 can check first whether the security protection function of the mobile equipment is in an enabled state. In the case that it is determined that the security protection function is in a disabled state, the mobile equipment protection application 310 no longer performs the following security protection operations. In the case that it is determined that the security protection function is in the enabled state, the mobile equipment protection application 310 shall continue to perform the following security protection operations. A specific example is, in the case that the security protection function is in the enabled state, the mobile equipment protection application 310 shall also further determine whether the sender of the short message is the predetermined object (that is, determine whether the short message comes from a safe number). If the sender of the short message is the predetermined object, then the mobile equipment protection application 310 shall continue to perform the following security protection operations; if the sender of the short message is not the predetermined object, then the mobile equipment protection application 310 no longer performs the following security protection operations.

It can be known from the above description that, the security protection setting information such as enabling/disabling of the security protection function, the communication number (i.e., the safe number) of the predetermined object and the security protection instructions comprising passwords shall be set in the application layer.

A specific example for setting the security protection setting information in the application layer in advance in the present embodiment is: the setting module 320 provides for the user a setting interface for the security protection setting information and the user inputs the security protection setting information through the setting interface. For example, the user sets the security protection function to be enabled, and sets a safe number and the password comprised in the security protection instruction which the user needs to enable. The above security protection instruction which is needed to be enabled can be one security protection instruction, or can also be a plurality of security protection instructions, or can also be all of the security protection instructions. The setting function of the setting module 320 provides the security protection setting information input by the user to the framework layer by invoking the setting function in the framework layer; the above setting function in the framework layer belongs to the mobile equipment protection service in the framework layer; the setting function in the framework layer then invokes the instruction processing function in the mobile equipment protection application 310 to provide the security protection setting information to the mobile equipment protection application, thereby the instruction processing function can store the security protection setting information in a folder corresponding to the mobile equipment protection application.

It should be noted that, the setting module 320 can also use other methods to set the security protection setting information in the application layer. For example, the setting module 320 transmits the security protection setting information to the mobile equipment protection application 310 by way of broadcasting, so that the mobile equipment protection application 310 stores the security protection setting information received based on the broadcasting in the folder corresponding it.

After the instruction processing function in the mobile equipment protection application 310 determines that the security protection function of the mobile equipment is in the enabled state and the sender of the short message is the predetermined object, the instruction processing function shall perform determination on the specific security protection instructions comprised in the contents of the short message one by one. For example, for one of the security protection instructions comprised in the contents of the short message, the instruction processing function determines whether the security protection instruction is a mobile equipment alarm instruction, a mobile equipment screen locking instruction, a data removing instruction, a mobile equipment locating instruction, a shooting instruction or to enable all of the security protection instructions; the operations performed by the mobile equipment protection application 310 thereafter are as described in the above Embodiment 1 and will no longer explained in detail here.

It should be particularly noted that, if the security protection module 300 has already performed the determination operation as to whether the mobile equipment has enabled the security protection function before the short message parsing, then in mobile equipment protection application 310 the determination operation as to whether the security protection function of the mobile equipment is in the enabled state no longer needs to be performed.

The algorithm and display provided here are not inherently related to any particular computer, virtual system or other equipments. Various general purpose systems can also be used together with the teaching based thereon. According to the above description in the present embodiment, the structure required to construct this kind of system is obvious. Furthermore, the present invention is not directed to any particular programming languages. It is to be understood, that the contents of the present invention described here can be implemented by using various programming languages, and the description above made for a particular language is for the purpose of disclosure of the preferred embodiment of the present invention.

A large number of specific details are described in the specification provided herein. However, it can be understood, that the embodiments of the present invention can be implemented without these specific details. In some instances, the methods, structures and techniques that are well known are not showed in detail, so as not to obscure the understanding of this specification.

Similarly, it is to be understood, that to simplify the disclosure and help to understand one or more of respective inventive aspects, in the above description of the exemplary embodiments of the present invention, respective features of the present invention sometimes are together grouped into a single embodiment, drawings of the description or the description therefore. However, the disclosed method shall not be construed as reflecting an intention that the present invention which is sought for security protection requires more features than those explicitly recorded in each claim. More specifically, as reflected in the claims of the present invention, inventive aspects lie in that they are less than all features of a single embodiment disclosed previously. Therefore, claims following the specific embodiment are hereby explicitly incorporated in this specific embodiment, wherein each claim itself serves as a separate embodiment of the present invention.

It can be understood by those skilled in the art that, the modules in the equipment in an embodiment can be adaptively changed and provided in one or more equipment different from the embodiment. The modules or units or components in an embodiment can be combined to one module or unit or component, and further they can be divided into a plurality of sub modules or subunits or subcomponents. Except that at least some of such features and/or procedures or units are mutually exclusive, any combination can be used to combine all features disclosed in the present specification (comprising the accompanying claims, abstract and drawings) and any method so disclosed or all procedures or units of the equipment. Unless otherwise explicitly stated, every feature disclosed in the present specification (comprising the accompanying claims, abstract and drawings) can be replaced by alternative features providing the same, equivalent or similar purpose.

Furthermore, it can be understood by those skilled in the art that, although some embodiments described herein comprise certain features comprised in other embodiments rather than other features, the combination of the features of the different embodiments means being within the scope of the present invention and form different embodiments. For example, in the following claims, any one of the embodiments sought for security protection can be used in any combination.

The respective components of the embodiments of the present invention can be implemented in hardware, or implemented in a software module running on one or more processor, or implemented in combination thereof. It should be understood by those skilled in the art, that in practice a microprocessor or a digital signal processor (DSP) can be used to implement some or all functions of some or all components in the Android-based mobile equipment security protection device according to the embodiments of the present invention. The present invention can also be implemented as an equipment or device program (e.g., a computer program and a computer program product) for executing some of all of the method described here. Such a program for implementing the present invention can be stored on a computer readable medium or can have a form of one or more signal. Such a signal can be downloaded from an Internet website or provided on a carrier signal or provided in any other form.

Figure 6:
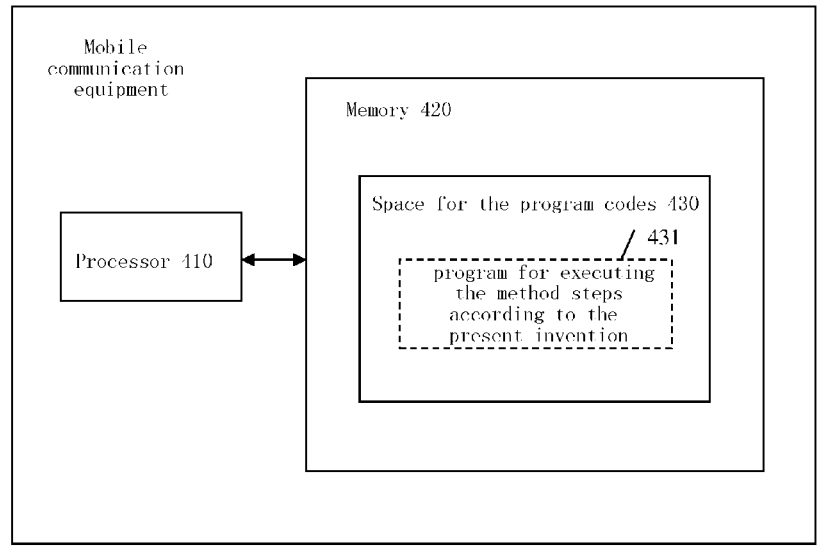
FIG. 6 shows a schematic diagram of shows a mobile communication equipment in which the method for security protection of Android-based mobile equipment of the present invention can be implemented.
Figure 7:
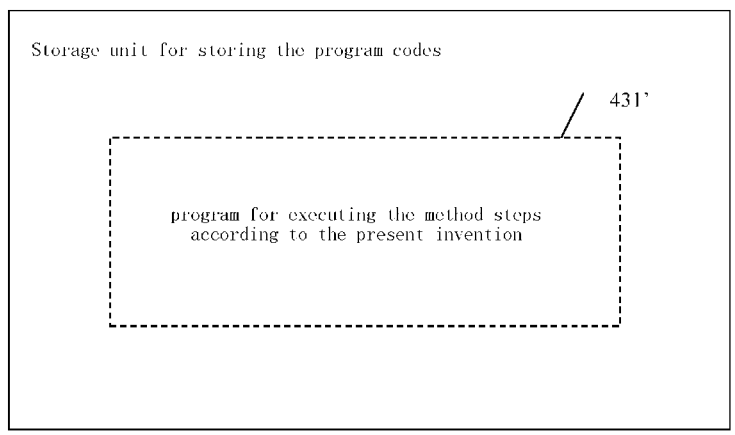
FIG. 7 shows a schematic diagram of an alternate embodiment of component 431 of FIG. 6.

For example, FIG. 6 shows a mobile communication equipment in which the method for security protection of Android-based mobile equipment of the present invention can be implemented, which traditionally includes a processor 410 and a computer program product or a computer readable medium in a form of a memory 420. The memory 420 can be an electronic memory such as a flash memory, an EEPROM (Electrically Erasable Programmable Read Only Memory), an EPROM, a hard disk or a ROM or the like. The memory 420 has a storage space 430 for program codes 431 for executing any method steps in the above method. For example, the storage space 430 for the program codes can include the respective program codes 431 for respectively implementing various steps in the above method. These program codes can be read out from or written into one or more computer program products. These computer program products include program code carriers such as a hard disk, a compact disk (CD), a memory card or a floppy disk. Such computer program products are generally portable or fixed storage units as described with reference to FIG. 7. The storage units can have storage sections or storage spaces, etc. arranged similar to those of the memory 420 in the mobile communication equipment of FIG. 6. The program codes can be compressed for example in a suitable format. Generally, the storage units include the program 431' for executing the method steps according the present invention, that is, codes that can be read by a processor for example such as 410. When these codes are run by the communication equipment, the communication equipment is caused to execute respective steps in the above described method.

It should be noted that, the above described embodiments are used for explaining the present invention, rather than limiting the present invention, and an alternative embodiment can be designed by those skilled in the art without departing from the scope of the appended claims. In the claims, any reference symbol positioned between parentheses should not be considered the limiting of the claims. The word "comprise" does not exclude the existence of an element or a step that is not described in the claims. The word "a" or "an" positioned before an element does not exclude the existence of a plurality of such element. The present invention can be implemented by way of a hardware comprising several different elements and by way of a computer suitably programmed. In a unit claim enumerating several devices, several of these devices can be specifically implemented by the same hardware. The use of the word "first", "second" and "third", etc. does not represent any sequence. These words can be construed as a name.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A method for security protection of Android-based mobile equipment, comprising:
   parsing a short message received at the framework layer of a mobile equipment;
   determining, on the basis of the parsing result, whether contents of the short message comprise a security protection instruction;
   providing the contents of the short message to a mobile equipment protection application of the application layer, if the contents of the short message comprise the security protection instruction;
   sending a broadcast corresponding to the short message, if the contents of the short message do not comprise the security protection instruction; and wherein the mobile equipment protection application is a built-in system application, and when the sender of the short message is a predetermined object, the mobile equipment protection application performs a corresponding security protection operation according to the security protection instruction comprised in the contents of the short message.

2. The method according to claim 1, wherein the parsing the short message received at the framework layer of the mobile equipment comprises:

when a short message dispatching function in the framework layer is invoked, invoking a short message checking function of a mobile equipment protection service by the short message dispatching function, the short message checking function parsing the short message.

3. The method according to claim 2, wherein the providing the contents of the short message to the mobile equipment protection application of the application layer comprises:

invoking, by the short message checking function, an instruction processing function of an instruction processing service in the application layer and providing the contents of the short message to the instruction processing function.

4. The method according to claim 2, wherein security protection setting information is set in the application layer, and the security protection setting information comprises:

enabling/disabling of a security protection function, a communication number of the predetermined object and a security protection instruction comprising a password.

5. The method according to claim 4, wherein the method further comprises:

at the application layer, providing, by a setting function in a security management application, the security protection setting information input by a user to the framework layer by invoking a setting function of the mobile equipment protection service of the framework layer; and storing, by the setting function in the framework layer, the security protection setting information in a folder corresponding to the mobile equipment protection application by invoking the instruction processing function of the instruction processing service of the application layer.

6. The method according to claim 4, wherein the performing the corresponding security protection operation according to the security protection instruction comprised in the contents of the short message comprises:

performing the corresponding security protection operation according to the security protection instruction comprised in the contents of the short message in the case that the security protection function is in an enabled state.

7. The method according to claim 6, wherein the performing the corresponding security protection operation according to the security protection instruction comprised in the contents of the short message comprises:

performing, by the instruction processing function, an alarming, a screen locking or a data removing operation, in the case that it is determined that the security protection instruction comprised in the contents of the short message is a mobile equipment alarm instruction, a mobile equipment screen locking instruction or a data removing instruction and the password in the security protection instruction comprised in the contents of the short message is the same as the corresponding password in the security protection setting information; or invoking, by the instruction processing function, a locating function of a locating service in the application layer in the case that it is determined that the security protection instruction comprised in the contents of the short message is a mobile equipment locating instruction, and invoking, by the locating function, a locating function of the operating system when it is determined that the password in the security protection instruction comprised in the contents of the short message is the same as the corresponding password in the security protection setting information; or invoking, by the instruction processing function, a shooting function of a shooting service in the application layer in the case that it is determined that the security protection instruction comprised in the contents of the short message is a shooting instruction, and invoking, by the shooting function, a shooting function of the operating system when it is determined that the password in the security protection instruction comprised in the contents of the short message is the same as the corresponding password in the security protection setting information; or performing, by the instruction processing function, an alarming, a screen locking, a data removing operations and operations for invoking the locating function of the locating service in the application layer and invoking the shooting function of the shooting service in the application layer, in the case that it is determined that the security protection instruction comprised in the contents of the short message is to enable all of the security protection instructions and the password in the security protection instruction comprised in the contents of the short message is the same as the corresponding password in the security protection setting information.

8. The method according to claim 1, wherein the contents of the short message provided to the mobile equipment protection application of the application layer comprise:

identification information corresponding to the security protection instruction.

9. A device for security protection of Android-based mobile equipment, comprising: one or more non-transitory computer readable medium configured to store computer-executable instruction: and at least one processor to execute the instructions to cause: parsing a short message received at the framework layer of a mobile equipment; determining, on the basis of the parsing result, whether contents of the short message comprise a security protection instruction; providing the contents of the short message to a mobile equipment protection application of the application layer, if the contents of the short message comprise the security protection instruction; sending a broadcast corresponding to the short message, if the contents of the short message do not comprise the security protection instruction; wherein the mobile equipment protection application is a built-in system application, and configured to perform a corresponding security protection operation according to the security protection instruction comprised in the contents of the short message when the short message is a short message sent by a predetermined object.

10. The device according to claim 9, wherein the parsing the short message received at the framework layer of the mobile equipment comprises:

when a short message dispatching function in the framework layer is invoked, invoking a short message checking function of a mobile equipment protection service by the short message dispatching function, the short message checking function parsing the short message.

11. The device according to claim 10, wherein the providing the contents of the short message to the mobile equipment protection application of the application layer comprises:

invoking, by the short message checking function, an instruction processing function of an instruction processing service in the application layer and providing the contents of the short message to the instruction processing function.

12. The device according to claim 10, wherein security protection setting information is set in the application layer, and the security protection setting information comprises:

enabling/disabling of a security protection function, a communication number of the predetermined object and a security protection instruction comprising a password.

13. The device according to claim 12, wherein the processor further executes the instructions to cause:

at the application layer, providing, by a setting function in a security management application, the security protection setting information input by a user to the framework layer by invoking a setting function of the mobile equipment protection service of the framework layer; and storing, by the setting function in the framework layer, the security protection setting information in a folder corresponding to the mobile equipment protection application by invoking the instruction processing function of the instruction processing service of the application layer.

14. The device according to claim 12, wherein the performing the corresponding security protection operation according to the security protection instruction comprised in the contents of the short message comprises:

performing the corresponding security protection operation according to the security protection instruction comprised in the contents of the short message in the case that the security protection function is in an enabled state.

15. The device according to claim 14, wherein the performing the corresponding security protection operation according to the security protection instruction comprised in the contents of the short message comprises:

performing, by the instruction processing function, an alarming, a screen locking or a data removing operation, in the case that it is determined that the security protection instruction comprised in the contents of the short message is a mobile equipment alarm instruction, a mobile equipment screen locking instruction or a data removing instruction and the password in the security protection instruction comprised in the contents of the short message is the same as the corresponding password in the security protection setting information; or invoking, by the instruction processing function, a locating function of a locating service in the application layer in the case that it is determined that the security protection instruction comprised in the contents of the short message is a mobile equipment locating instruction, and invoking, by the locating function, a locating function of the operating system when it is determined that the password in the security protection instruction comprised in the contents of the short message is the same as the corresponding password in the security protection setting information; or invoking, by the instruction processing function, a shooting function of a shooting service in the application layer in the case that it is determined that the security protection instruction comprised in the contents of the short message is a shooting instruction, and invoking, by the shooting function, a shooting function of the operating system when it is determined that the password in the security protection instruction comprised in the contents of the short message is the same as the corresponding password in the security protection setting information; or performing, by the instruction processing function, an alarming, a screen locking, a data removing operations and operations for invoking the locating function of the locating service in the application layer and invoking the shooting function of the shooting service in the application layer, in the case that it is determined that the security protection instruction comprised in the contents of the short message is to enable all of the security protection instructions and the password in the security protection instruction comprised in the contents of the short message is the same as the corresponding password in the security protection setting information.

16. A non-transitory computer readable medium in which having instructions stored thereon that, when executed by at least one processor, cause the at least one processor to perform operations for security protection of Android-based mobile equipment, which comprises the steps of:

parsing a short message received at the framework layer of a mobile equipment;

determining, on the basis of the parsing result, whether contents of the short message comprise a security protection instruction;

providing the contents of the short message to a mobile equipment protection application of the application layer, if the contents of the short message comprise the security protection instruction; and sending a broadcast corresponding to the short message, if the contents of the short message do not comprise the security protection instruction, wherein the mobile equipment protection application is a built-in system application, and when the sender of the short message is a predetermined object, the mobile equipment protection application performs a corresponding security protection operation according to the security protection instruction comprised in the contents of the short message.

* * * * *